Patented Nov. 21, 1950

2,530,770

UNITED STATES PATENT OFFICE 2,530,770

FUNGICIDAL COMPOSITION

Sever L. Hopperstead, Brighton, Mich., assignor to The B. F. Goodrich Company, New York, N. Y., a corporation of New York No Drawing. Application September 6, 1946, Serial No. 695,291

2 Claims. (Cl. 167—42)

This invention relates to fungicidal compositions and to the treatment of plants therewith, and more particularly to new compositions which can be applied to the non-edible portions of food-producing plants to protect them from the destruction and deterioration caused by fungi and bacterial diseases.

The fungicidal compositions of this invention comprise an aqueous dispersion of a polyalkylene polysulfide admixed with a quaternary ammonium salt derived from a heterocyclic tertiary amine preferably one containing a six-membered ring consisting of one tertiary nitrogen atom and five carbon atoms wherein the nitrogen atom is connected to one carbon atom by a single bond and to another carbon atom by means of a double bond. I have found that the alkyl quaternary ammonium salts of these heterocyclic tertiary amines when used in combination with an aqueous dispersion of an alkylene polysulfide preferably polyalkylene polysulfide, are particularly effective in combating the destruction and deterioration to the non-edible portion of food-producing plants brought about by fungi and bacterial diseases.

My new compositions are prepared by mixing an aqueous solution of a quaternary ammonium salt of any of the above-defined six-membered heterocyclic tertiary amines with an aqueous dispersion of a polyalkylene polysulfide preferably an aqueous latex-like dispersion of polyethylene polysulfide. The preferred polysulfide dispersions can be prepared by condensing ethylene dichloride with sodium polysulfide in the presence of a salt-stable emulsifying or dispersing agent such as casein, sodium and calcium lignin sulfonates, alkyl benzene sulfonates having more than 20 carbon atoms in the alkyl group, aryl alkyl sulfonates, sorbitan monolaurates and others. The preferred emulifying agent is sodium lignin sulfonate, for extremely stable latex-like dispersions can be prepared by employing this emulsifying agent. The resulting polyethylene polysulfide is allowed to settle or caused to settle by flocculation, is washed with water by decantation to remove the sodium chloride formed during the condensation, and is redispersed or re-emulsified by adding water and stirring.

The quaternary ammonium salts which may be employed according to my invention include, for example, the methyl, ethyl, butyl, propyl, amyl, octyl, decyl, lauryl and cetyl chlorides, bromides, iodides, rhodanates and acetates of such six-membered heterocyclic amines as pyridines, quinolines, isoquinolines, acridines, and the like. Other quaternary ammonium salts of such amines wherein the acid radical is any other inorganic or organic monovalent acid radical may also be used.

The concentration of the quaternary ammonium salt in the mixture may be varied as desired to meet special conditions, but usually a lesser amount of the quaternary salt than of the polysulfide is employed. In general, about 1 part by weight of quaternary salt to about 5 to 50 parts by weight of polysulfide, which is present in about 500 to 5,000 parts of aqueous dispersion, is sufficient for most uses. It should be understood, however, that compositions containing a lesser or greater amount of water, and in which the ratio of quaternary salt to polysulfide may be varied from as little as 1 to 1,000 or even less to as much as 1 to 1 or even more, are also within the scope of this invention since the proportions of the ingredients of my new compositions are in no way critical.

To illustrate the invention, the following specific composition was employed successfully to control apple scab and tomato blight.

Four pounds of an aqueous dispersion containing 50% polyethylene polysulfide by weight was diluted to 100 gallons with stirring. To this dilute aqueous dispersion there was added one pound of an aqueous solution containing 20% by weight of lauryl isoquinolinium bromide. The resulting mixture was stirred for about 30 minutes to insure complete mixing of the components.

This mixture containing lauryl isoquinolinium bromide and an aqueous dispersion of polyethylene polysulfide was sprayed on a group of apple trees in an orchard infested with the devastating apple scab which is induced by the parasitic fungus *Venturia inaequalis* (Eke.) Aderh. The control of the apple scab was complete for all trees sprayed with this composition.

The above composition was sprayed on tomato plants which were infested with tomato blight. The control of the tomato blight was complete for all the sprayed plants.

An aqueous solution containing lauryl isoquinolinium bromide alone in the same concentration as used above was also sprayed on apple trees infested with apple scab and tomato plants infested with tomato blight. It was found that lauryl isoquinoline bromide alone gave only a 33% control. An aqueous dispersion of polyethylene polysulfide alone in the same concentration as above was also tested in the same manner and gave a control of about 50%. Thus, it is apparent that the effectiveness of each of the constituents was enhanced by combining them.

The reasons for the synergistic effect observed by using a composition comprising both the polyalkylene polysulfide and the quaternary salt are not known with certainty. It is thought that the quaternary salt may chemically combine with the polyalkylene polysulfide to produce a new chemical of remarkable fungicidal activity. Regardless of whether such a chemical combination occurs, however, it has been found that merely admixing the polyalkylene polysulfide dispersion with the quaternary salt produces a composition which is far superior as a fungicide to either of the materials alone.

My compositions are also capable of protecting food-producing plants from other fungi and bacterial diseases. For example, my compositions can be employed to combat such plant diseases as cherry leaf spot, *Coccomyces hiemalis* Hig., brown rot, *Sclerotina fructicola* (Wint.), Rehm, and *Sclerotina americana* (Wormald), Norton and Ezekiel, and others. They are also effective against fungus diseases of flowers and are useful in preventing mildew of fabrics and in various other fungicidal applications.

While I have disclosed specific examples of my invention, I do not thereby desire nor intend to limit myself solely thereto, for, as hitherto stated, other equivalent chemical compounds can be employed and the proportions of the active ingredients may be varied if desired without departing from the spirit and scope of my invention as defined in the appended claims.

I claim:

1. A fungicidal composition containing as the essential active ingredients polyethylene polysulfide and lauryl isoquinolinium bromide dispersed in an aqueous solution of sodium lignin sulfonate, there being present in said composition about one part by weight of the bromide for each 1 to 50 parts by weight of the polysulfide in 500 to 5,000 parts by weight of aqueous dispersion.

2. A fungicidal composition containing as the essential active ingredients polyethylene polysulfide and lauryl isoquinolinium bromide dispersed in an aqueous solution of sodium lignin sulfonate, there being present in each 100 gallons of said composition about 1 part by weight of said bromide compound and about 10 parts by weight of the polyethylene polysulfide.

SEVER L. HOPPERSTEAD.

REFERENCES CITED

The following references are of record in the file of this patent:

UNITED STATES PATENTS

| Number | Name | Date |
| --- | --- | --- |
| 2,102,564 | Bonnstein | Dec. 14, 1937 |
| 2,271,378 | Searle | Jan. 27, 1942 |
| 2,435,458 | Mosher | Feb. 3, 1948 |

FOREIGN PATENTS

| Number | Country | Date |
| --- | --- | --- |
| 414,299 | Great Britain | Aug. 2, 1934 |

OTHER REFERENCES

Wadley: U. S. D. A. ET-223 June 1945, "The Evidence Required to Show Synergistic Action of Insecticides," 7 pages.

Mfg. Chemist and Mfg. Perfumer, October 1945, XVI, 10, pages 356–357.